United States Patent
Mihalos et al.

(10) Patent No.: US 10,966,434 B2
(45) Date of Patent: Apr. 6, 2021

(54) PROCESS AND SYSTEM FOR DEPOSITING FILLING ON A BISCUIT

(71) Applicant: Intercontinental Great Brands LLC, East Hanover, NJ (US)

(72) Inventors: Mihaelos N. Mihalos, Palisades Park, NJ (US); Chris E. Robinson, Sparta, NJ (US); Supapong Siris, Somerset, NJ (US); Rachel DeCagna, Loveland, CO (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 0 days.

(21) Appl. No.: 16/875,268

(22) Filed: May 15, 2020

(65) Prior Publication Data
US 2020/0345017 A1    Nov. 5, 2020

Related U.S. Application Data

(63) Continuation of application No. 14/773,406, filed as application No. PCT/US2014/021488 on Mar. 7, 2014, now Pat. No. 10,694,755.

(60) Provisional application No. 61/776,345, filed on Mar. 11, 2013.

(51) Int. Cl.
*A21C 15/00* (2006.01)
*A21D 13/32* (2017.01)

(52) U.S. Cl.
CPC ............ *A21C 15/002* (2013.01); *A21D 13/32* (2017.01)

(58) Field of Classification Search
CPC .............................. A21C 15/002; A21D 13/22
USPC ........................................................ 426/303
See application file for complete search history.

(56) References Cited

U.S. PATENT DOCUMENTS

| | | |
|---|---|---|
| 3,215,093 A | 11/1965 | McKown et al. |
| 3,499,586 A | 3/1970 | Conley, Jr. |
| 3,513,784 A | 5/1970 | Kesselman |
| 4,162,882 A | 7/1979 | Rose |
| 5,974,958 A | 11/1999 | Lilley et al. |
| 8,071,151 B2 | 12/2011 | Wilkey |
| 2004/0159248 A1 | 8/2004 | Wilkey |
| 2011/0086147 A1 | 4/2011 | Van Der Ent |
| 2011/0162536 A1 | 7/2011 | Mittal |

FOREIGN PATENT DOCUMENTS

| | | |
|---|---|---|
| CN | 2040307 U | 7/1989 |
| CN | 201393514 Y | 2/2010 |
| GB | 2132465 A | 7/1984 |
| WO | 199706691 A1 | 2/1997 |
| WO | 2011081964 A1 | 7/2011 |

OTHER PUBLICATIONS

International Preliminary Report on Patentability for PCT/US2014/021488, dated Jul. 8, 2014, 7 pages.
EPO Communication for EP 14779662.7, dated Feb. 26, 2018, 5 pages.
Extended European Search Report for EP 14779662.7, dated Oct. 14, 2016, 9 pages.
Canadian Office Action for CA 2,895, 139, dated May 2, 2016, 3 pages.
Notification of First Office Action for Chinese Appl 201480011306.5, dated May 19, 2016, 18 pages.
Notification of Second Office Action for Chinese Appl 201480011306.5, dated Dec. 15, 2016, 15 pages.
Notification of Third Office Action for Chinese Appl 201480011306.5, dated Jun. 7, 2017, 15 pages.
Patent Examination Report dated Dec. 18, 2015 for Australian Patent Application No. 2014249580.
EPO Communication for EP 14779662.7, dated Feb. 18, 2019, 5 pages.

*Primary Examiner* — Jyoti Chawla
(74) *Attorney, Agent, or Firm* — Morgan, Lewis & Bockius LLP

(57) ABSTRACT

A method for the production of a food item having a filling includes conveying a food item to a first filling station. The filling station has a first rotating stencil with a first plurality of filling discharge ports. At least one first filling segment is formed by discharging filling, through the discharge ports, onto the food item. The food item is conveyed to a second filling station. The second filling station has a second rotating stencil with a second plurality of filling discharge ports. At least one additional filling segment is formed by discharging filling, through the second plurality discharge ports, onto the food item wherein the at least one additional filling segment is disposed on the food item adjacent to the at least one first filling segment.

18 Claims, 5 Drawing Sheets

PROCESS AND SYSTEM FOR DEPOSITING FILLING ON A BISCUIT

CROSS-REFERENCE TO RELATED APPLICATIONS

This application is a continuation of U.S. patent application Ser. No. 14/773,406 filed Sep. 8, 2015, which is a U.S. National Stage Entry of International Patent Application No. PCT/US2014/021488, filed Mar. 7, 2014, which in turn claims the benefit of U.S. Provisional Patent Application No. 61/776,345 filed Mar. 11, 2013 entitled "Process And System For Depositing Filling On A Biscuit", which are incorporated by reference herein in their entirety.

FIELD OF THE INVENTION

The present invention relates to the continuous production of a food product that includes, for example, a sandwich having a plurality of filling segments disposed therein, the filling segments being substantially uniform and having different organoleptic properties.

BACKGROUND OF THE INVENTION

Sandwich cookies and crackers can have a variety of shapes and configurations. Examples of such configurations include elongate or rectangular biscuits with filling disposed between the biscuits. It is sometimes desirable to include multiple fillings in a biscuit sandwich. Depositing multiple fillings on a biscuit can be challenging, for example, in a continuous high volume continuous production system where the biscuit is elongate and the fillings have different viscosities and large volumes of evenly distributed fillings are desired.

BRIEF SUMMARY OF THE INVENTION

In one embodiment, there is a method for the production of a food item having a filling. The method may further include conveying a food item to a first filling station where the first filling station has a first rotating stencil with a first plurality of filling discharge ports. The method may further include forming at least one first filling segment by discharging filling, through the discharge ports, onto the food item. A further step may include conveying the food item to a second filling station where the second filling station has a second plurality of filling discharge ports. In one embodiment, the method may further include forming at least one additional filling segment by discharging filling, through the second plurality discharge ports, onto the food item wherein the at least one additional filling segment is disposed on the food item adjacent to the at least one first filling segment.

In one aspect of the invention, the first plurality of filling discharge ports is arranged in an array. In one embodiment, the array is a configured in one of a row, a circle, an ellipse, a square, a rectangle, and an irregular pattern. In a further aspect of the invention, the second plurality of filling discharge ports may be arranged in a second array. In a still further aspect of the invention, the first array and the second array are configured and dimensioned to deposit the at least one first filling segment adjacent to the at least one additional filling segment. In yet another embodiment, the at least one first filling segment comprises two filling segments and the at least one additional filling segment is interposed between the two filling segments. In a further embodiment, the at least one first filling segment is deposited onto the food item in a first pattern and wherein the at least one additional filling segment is deposited onto the food item in a second pattern that abuts but does not overlap the first pattern. In one embodiment, the first pattern includes a first plurality of substantially parallel rows and the second pattern comprises at least one additional row that is substantially parallel to the first plurality of rows. In another embodiment, the first pattern includes an open perimetrical shape and the second pattern is disposed within the open perimetrical shape. For example, in one embodiment, the open perimetrical shape is one of a square, a circle, an ellipse and an oval having a continuous substantially uniformly deposited filling segment surrounding an open area on the food product that is substantially free of filling. In one embodiment, the at least one first filling segment has a first organoleptic property and the at least one additional filling segment has a second organoleptic property.

One method of present invention includes conveying a food item to a first filling station, the filling station having a first rotating stencil with two spaced apart rows of filling discharge ports, each row comprising a plurality of filling discharge ports disposed on the circumference of the first rotating stencil; forming two filling segments by discharging filling, through the two rows of filling discharge ports, onto the food item; conveying the food item to a second filling station, the second filling station having a second rotating stencil with a third row of filling discharge ports, the third row of filling discharge ports comprising a plurality of discharge ports disposed on the circumference of the second rotating stencil; and forming a third filling segment by discharging filling, through the third row of filling discharge ports, onto the food item.

In one embodiment, the filling discharged through second filling station is deposited between the two filling segments. In a further embodiment, the two filling segments are deposited onto the food item after the third filling segment is deposited onto the food item. In one embodiment, the food item is a baked good having a rectangular configuration and the step of forming two filling segments further includes depositing filling longitudinally onto the baked good such that the two filling segments are substantially parallel. In another embodiment, each of the two spaced apart rows of the filling discharge ports comprise an array of substantially round discharge ports, each substantially round discharge port being substantially evenly spaced apart in each row and wherein each array is disposed on only one hemisphere of the first rotating stencil. In another embodiment, the third row of filling discharge ports include an array of substantially oval-shaped discharge ports, each substantially oval-shaped discharge port having a major axis that is oriented transverse to the circumference of the second rotating stencil, the oval-shaped discharge ports being evenly spaced apart in the third row and the array of substantially oval-shaped discharge ports is disposed on only one hemisphere of the second rotating stencil.

In a further embodiment, the second rotating stencil further includes two channels circumferentially disposed on an outer surface of the second rotating stencil, the third row of filling discharge ports being disposed between the two channels, the two channels being aligned with the two spaced apart rows of the first rotating stencil such that in operation the two filling segments discharged through the two rows of filling discharge ports of the first rotating stencil align with the two channels as the food item passes the second filling station. In a further embodiment, for example, the second rotating stencil includes a rib disposed between the two channels, the third row of filling discharge ports being disposed on the rib. In yet another embodiment, the first rotating stencil operates in coordination with the second rotating stencil such that the two filling segments and the third filling segment are deposited onto the food item in a substantially uniform volume and in a substantially parallel configuration.

In one embodiment of the present invention, there is a system for the production of a food item having a filling thereon. One embodiment of the system includes a first filling station having a first rotating stencil with two spaced apart rows of filling discharge ports, each row comprising a plurality of discharge ports disposed on the circumference of the first rotating stencil; a second filling station having a second rotating stencil with a third row of filling discharge ports, the third row comprising a plurality of discharge ports disposed on the circumference of the second rotating stencil; and a conveyor configured to pass a food item in alignment with the first filling station and the second filling station.

In one embodiment of the system, the first rotating stencil is configured and dimensioned to evenly deposit two substantially parallel rows of filling on the food item. In another embodiment, each of the two spaced apart rows of the filling discharge ports comprise an array of substantially round discharge ports, each substantially round discharge port being substantially evenly spaced apart in each row and wherein each array is disposed on only one hemisphere of the first rotating stencil. In yet another embodiment, the third row of filling discharge ports include an array of substantially oval-shaped discharge ports, each substantially oval-shaped discharge port having a major axis that is oriented transverse to the circumference of the second rotating stencil, the oval-shaped discharge ports being evenly spaced apart in the third row and wherein the array of substantially oval-shaped discharge ports is disposed on only one hemisphere of the second rotating stencil. In a still another embodiment, the second rotating stencil further includes two channels circumferentially disposed on an outer surface of the second rotating stencil, the third row of filling discharge ports being disposed between the two channels, the two channels being aligned with the two spaced apart rows of the first rotating stencil such that in operation the two filling segments discharged through the two rows of filling discharge ports of the first rotating stencil align with the two channels as the food item passes the second filling station. In yet another embodiment, the second rotating stencil further includes a rib disposed between the two channels, the third row of filling discharge ports being disposed on the rib. The system of the present invention may further include a controller configured to rotate the first rotating stencil and the second rotating stencil in coordination such that three rows of three filling segments are longitudinally deposited onto the food item at a substantially uniform volume and in a substantially parallel configuration.

DETAILED DESCRIPTION OF THE INVENTION

Food products such as sandwich cookies and crackers may be continuously produced in a high speed production system. Among the products that can be produced from the systems and methods disclosed herein are elongate biscuit sandwiches having two or more different fillings. The biscuits are not limited to rectangular shapes, however, and may have other elongate shapes including oval or racetrack shaped biscuits. In one such high speed production system, a first biscuit portion (e.g., crackers and cookies) or base cake of the food product is transmitted by conveyor to a plurality of filling stations (e.g., in-line filling stations) where a plurality of prepared fillings are applied to one side of the biscuit to form a topped base cake. The topped base cake may then travel to another station where a second biscuit caps the topped first biscuit to complete the sandwich. Fillings may be applied to a base cake using a rotating stencil system. Large volumes of filler or crème can be applied to a bottom base cake (e.g., a biscuit). The volume of filler deposited on each bottom base cake may be at least about 1.5 cubic inches, for example at least 1.75 cubic inches and the deposited filler may have a length to width ratio of at least about 2:1, preferably at least about 2.5:1. The base cakes and ribbon filler may be elongated in the direction of product travel during deposition of the ribbon filler.

In one embodiment, filling stencils are retrofit to operate on a standard sandwiching machine such as those supplied by APV, Baker-Perkins or Peters/Peerless.

Exemplary systems for conveying prepared fillings to a filling stencil are disclosed in U.S. Pat. No. 4,469,021 granted Sep. 4, 1984 to Rose et al., U.S. Pat. No. 5,974,958 granted Nov. 2, 1999 to Lilley et al.; U.S. Pat. No. 4,162,882 granted on Jul. 31, 1979 to Rose, and U.S. Pat. No. 4,708,054 granted on Nov. 24, 1987 to Newbery et al. each such document hereby being incorporated by reference in its entirety herein.

Among the products that can be produced from the systems and methods disclosed herein are elongate biscuit sandwiches having two or more different fillings. The biscuits are not limited to rectangular shapes, however, and may have other elongate shapes including oval or racetrack shaped biscuits.

The continuous systems and method disclosed herein may produce biscuit sandwiches having filling deposited therein. In one embodiment, the filling is deposited as segments on the base cake. The filling segments may, for example, be deposited in longitudinal strips. The longitudinal strips may include parallel strips. The longitudinal strips may further be substantially uniform in volume, area and/or cross section along the length of the strip. Two or more of the strips may be applied to a biscuit and those two or more strips may each have a different flavor.

Figure 1:
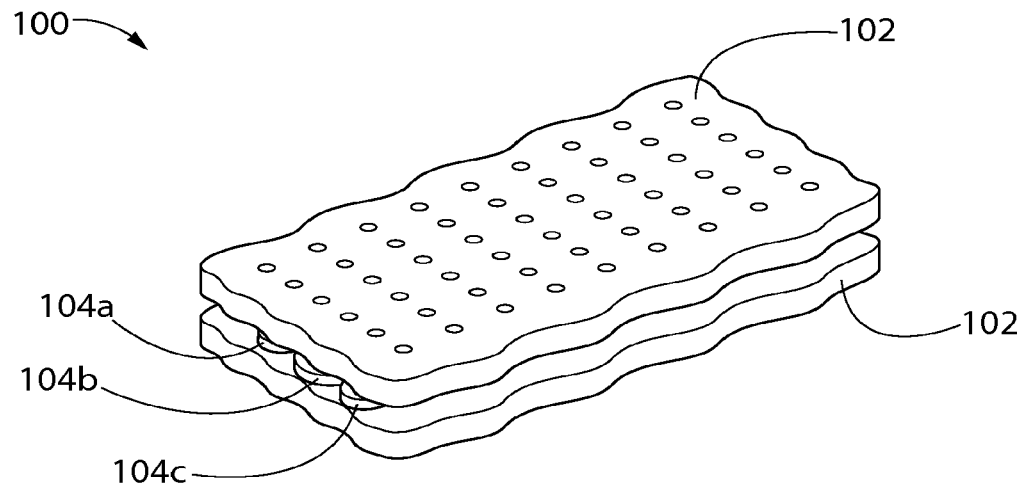
FIG. 1 is a perspective view of a food product of one embodiment of the present invention.
Figure 2:
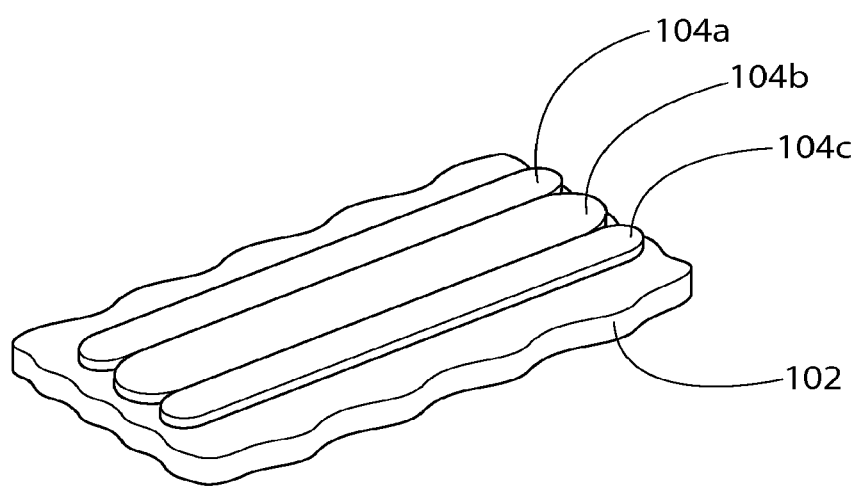
FIG. 2 is a perspective view of the food product shown in FIG. 1 with a top biscuit removed.

FIGS. 1 and 2 illustrate one embodiment of a food product 100. Food product 100 includes two biscuits 102 and three filling strips 104a, 104b, and 104c. The food products 100 of the present invention may include more or fewer filling strips. For example, in an embodiment illustrated in FIG. 2, there is a portion of a food product 100 that includes a biscuit 102 and three filling segments 104a, 104b, and 104c deposited thereon. In a preferred embodiment, each of the filling segments 104a, 104b, and 104c is deposited onto a biscuit 102 such that the filling segments 104a, 104b, and 104c have a substantially similar volume. Each of filling segments 104a, 104b, and 104c may each be deposited such that each segment is symmetrical. One or more of the filling segments 104a, 104b, and 104c may deposited in such a way that the filling does not taper along the length of the filling segment. In one embodiment, a cross sectional area of the deposited filling does not vary along the length of each filling segment 104a, 104b, and 104c. Two or more of filing segments 104a, 104b, and 104c may be deposited in such that none of the filling segments 104a, 104b, and 104c contacts an adjoining filling segment 104a, 104b, and 104c. In one embodiment, adjoining filling segments 104a, 104b, and 104c may contact each other substantially along the entire length of the adjoining filling segments 104a, 104b, and 104c.

The methods and systems disclosed herein may also produce such filling segments 104a, 104b, and 104c that have different organoleptic characteristics that vary from filling segment to filling segment. For example, filling segments 104a, 104b, and 104c may be deposited within a biscuit sandwich such that one filling characterizes the outer two (e.g., 104a and 104c) of the three filling segments, and a second filling characterizes the central longitudinal filling segment 104b. In one embodiment, food product 100 includes a plurality of filling segments where no two adjoining filling segments have the same organoleptic properties. The differences in filling organoleptic properties may include differences in flavor, texture, rheology and/or visual appearance. Differences in fillings may also include different binding characteristics (such as the ability to bind two biscuit layers to retain the integrity of the sandwich). The deposited fillings may include one or more of chocolate, dairy, yogurt, crème, cheese, compound coatings, peanut butter, marshmallow, jams and jellies, fat-based fillings, high water activity fillings, and low water activity fillings. One or more of the fillings may further include inclusions such as chocolate chips, fruit, bacon, candy pieces and the like. Fillings of different viscosities may be used. For example, in one embodiment, outer filling segments 104a and 104c may be a higher viscosity filling than inner filling segment 104b. In one embodiment, the higher viscosity outer filling segments may serve to retain the lower viscosity inner filling segment at least until the inner filling segment sufficiently solidifies so as not to require retention.

One approach to delivering different fillings to a single biscuit is to feed the different fillings through different filling stencils that are configured and dimensioned to deliver the different fillings to the single biscuit in a high speed continuous process. One such system for delivering multiple segments of filling to a biscuit includes a first filling stencil configured and dimensioned to deliver one or more first filling segments to a biscuit and a second filling stencil configured and dimensioned to add one or more additional filling segments to the biscuit. In some embodiments, a third filling stencil may be employed to deliver one or more additional filling segment to the food item and so on. Each filling stencil may be aligned to deliver filling segments in an adjacent configuration. Each filling stencil may deliver filling segments that are interposed between segments that are already deposited on the biscuit. For example, a first filling stencil may deliver filling segments 104a and 104c and a second filling stencil may deliver filling segment 104b. In one embodiment, outer filling segments 104a and 104c may be delivered before inner filling segment 104b is delivered to biscuit 102. In an alternative embodiment, inner filling segment 104b is delivered before outer filling segments 104a and 104c. Filling segments 104 may also be delivered in patterns. In some embodiments, multiple patterns of filling may be deposited on a biscuit. Those patterns may be adjacent patterns and interposed patterns. For example a square first filling pattern may be supplemented with a second pattern that fills in the square with a second filling (e.g., a filling with different properties).

Figure 3:
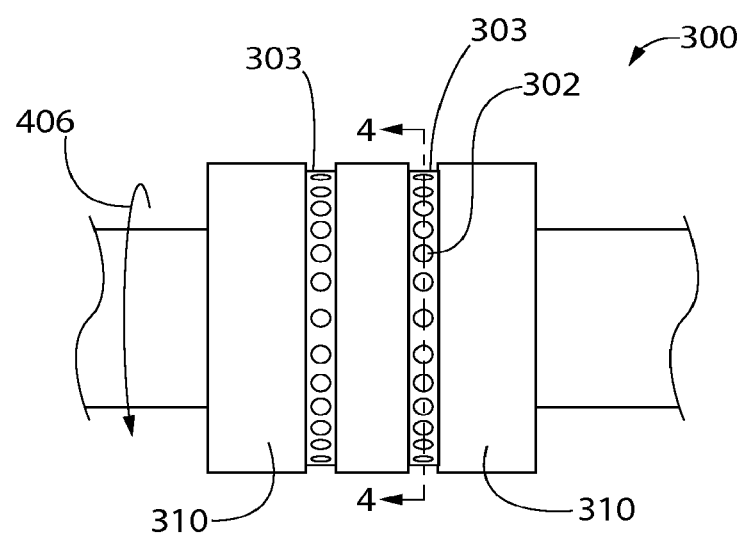
FIG. 3 is a front elevational view of a stencil of one embodiment of the present invention.
Figure 5:
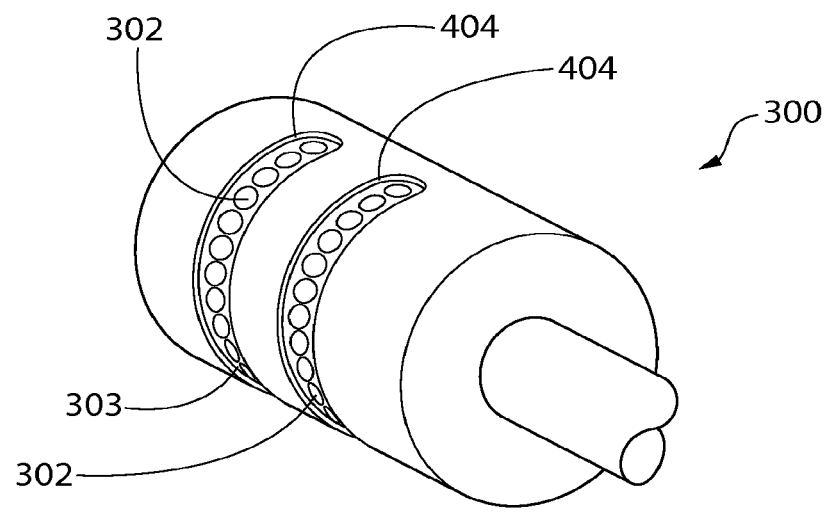
FIG. 5 is perspective view of a stencil of one embodiment of the present invention.
Figure 6:
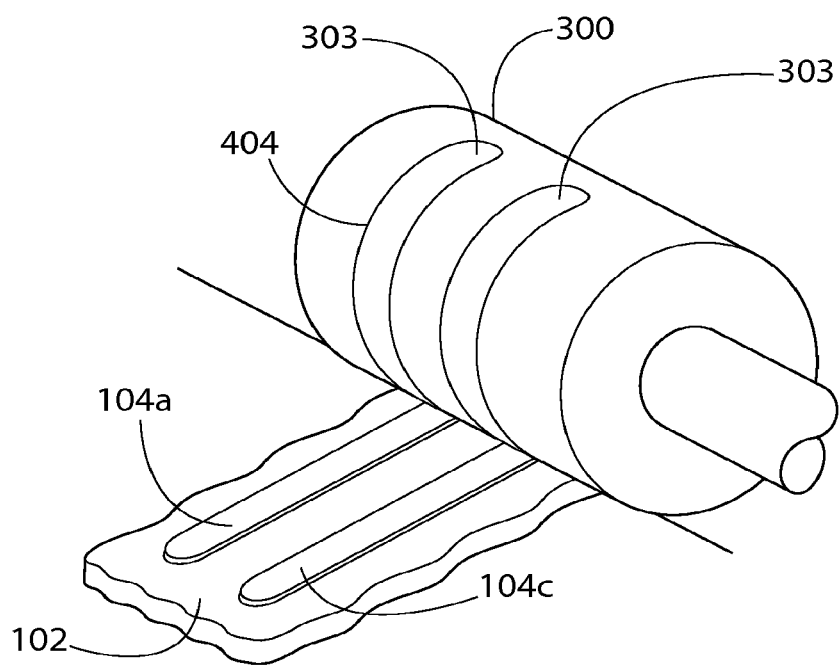
FIG. 6 is perspective view of the stencil of FIG. 5 shown during use.

FIG. 3 illustrates one embodiment of a filling stencil 300. Filling stencil 300 may be a rotating filling stencil. Filling stencil 300 may include substantially cylindrical body having an outer face 310. Filling stencil 300 may further include a plurality of discharge ports 302 that are configured to permit the discharge of a filling flowing through a central annulus (not shown) of filling stencil 300 toward outer face 310 from discharge ports 302 to, for example, a biscuit 102. Filling stencil 300 may further include a discharge channel 404 (FIG. 5 and FIG. 6). Discharge channel 404 may be in communication with discharge ports 203.

Discharge ports 302 may be arranged in one or more arrays 303. Arrays 303 may include a plurality of aligned discharge ports 302. Exemplary discharge ports 302 of array 303 are aligned such that a centerline of each discharge port is aligned along at least a segment of the circumference of filling stencil 300. The discharge ports 302 may be evenly spaced apart within an array 303, as illustrated in FIG. 3. In one embodiment, discharge ports 302 are spaced apart at an angle α (FIG. 4) of about 8½ degrees. In one embodiment, the angle is selected to accommodate the length of the biscuit. The preferred angle for biscuits that range from 2:1 to 2.5:1 (length vs. width) ranges from about 6.5 degrees to about 10 degrees. In one embodiment, arrays 303 are configured in a row along a circumference of filling stencil 300 (e.g., FIG. 3). In other embodiments, arrays 303 are arranged in curved lines, circular arrays, oval arrays, elliptical arrays and/or square arrays. In one embodiment shaped arrays produce a perimeter of filling around an open area. For example, an array may be configured in a perimetrical or hoop-type configuration. One or more filling stencils (e.g., multiple in-line filling stencils) may include two parallel arrays, also as illustrated in FIG. 3. In one embodiment, more than two parallel arrays may be included in a single stencil. Arrays 303 may be oriented along the circumference of filling stencil 300. Arrays 303 may also be oriented axially on filling stencil 300. In an axially oriented configuration, filling stencils may deposit filling segments transverse to the direction of rotation 406 of filling stencil 300.

Figure 4:
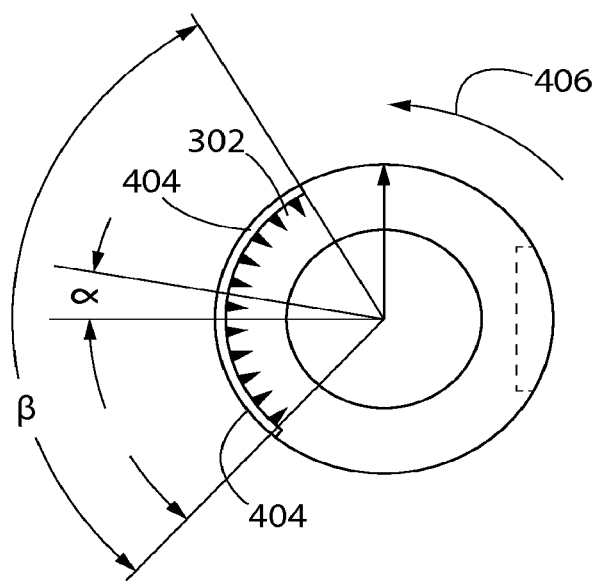
FIG. 4 is a side cross sectional view of the stencil of FIG. 3 taken along line 4-4.

FIG. 4 is a cross section through one such array 303. As illustrated in FIG. 4, array 303 may extend within a segment 402 of the circumference of filling stencil 300 that is less than the full circumference of filling stencil 300. Segment 402 may be approximately 30% of the total circumference of filling stencil 300. Array 303 may extend around a circumference of filling stencil 300 an angle β of from about 100 degrees to about 130 degrees (FIG. 4). In one embodiment, discharge ports 302 are evenly distributed within segment 402. Discharge ports 302 may have a longitudinal axis that intersects the axis of rotation of filling stencil 300 (See, e.g., FIG. 4).

The number, size and shape of discharge ports 302 in a given array may be selected based upon the volume, shape and configuration of the desired filling segment, the viscosity of the material making up the filling segment and/or the processing conditions and set points desirable for the continuous high-speed production of food product 100. Discharge ports may be round, elongated, oval, elliptical or may be configured into a slot, in some embodiments a combination of shapes of discharge port 302 may be used. For example, a filling stencil may include an array of round discharge ports and an array of elongated, oval or elliptical discharge ports. In systems that use, for example, multiple inline filling stencils to deposit fillings on single biscuits, a first stencil may include one or more arrays having round discharge ports 302 and a second in-line stencil that uses one or more arrays of elongated, oval or elliptical discharge ports. It has been found that an array 303 of thirteen substantially round discharge ports having a diameter of approximately 7/32 inches is effective in delivering a peanut butter filling segment having a approximately 3.5 inches in a substantially uniform distribution.

In some embodiments, filling material may be discharged directly from discharge port ports 302 onto biscuit 102. By contrast, in the embodiment illustrated in FIGS. 3-6, array 303 may further include a discharge channel 404 that is in communication with discharge ports 302, Discharge channel 404 may be a depression in the outer face 310 of filling stencil 300. The depression may be configured such that discharge ports 302 do not terminate at outer face 310 but rather terminate within discharge channel 404 (best illustrated in FIG. 4). Discharge channel 404 defines a boundary around array 303, in some embodiments. Discharge channel 404 can be further configured and dimensioned based upon the desired shape and size of filling segment 104. In one embodiment, to produce a substantially rectangular filling segment 104, a discharge channel 404 that is rectangularly oriented on the face of filling stencil 300 may be included. In another embodiment, a discharge channel with irregular boundaries may produce a filling segment 104 that is irregular in appearance. In some embodiments an irregular appearance is appealing to consumers who appreciate products that appear imperfect or homemade. In other embodiments, for example, ripples, ridges, saw-tooth configurations or a zig-zag discharge channel may be employed to produce appealing filling segment shapes and configurations such as those substantially matching the shape and configuration of the discharge channel.

In some operational embodiments, filling is discharged from discharge ports 302 and collects in discharge channel 404. In one embodiment, filling substantially fills discharge channel 404. As shown in FIG. 6, filling that has accumulated in filling channel 404 contacts or is otherwise deposited biscuit 102 as biscuit 102 passes rotating filling stencil 300 and filling segment 104 may thereby be deposited onto biscuit 102. In one embodiment the shape and/or volume of filling segment 104 substantially matches the shape and volume of discharge channel 404.

In some embodiments (e.g., those that include multiple in-line filling stencils), a filling stencil that first deposits filling onto a food product may be configured to include a substantially continuous outer face that is interrupted only by discharge channel 404, as illustrated in FIG. 3. Because filling is discharged from the filling stencil 300 of FIG. 3 onto a biscuit 102 that has yet to contain any filling, outer surface 310 would not disturb any previously deposited filling. In some embodiments, it is desirable to configure a second inline filling stencil to avoid disturbing a previously deposited filling while depositing further filling segments onto biscuit 102.

Figure 7A:
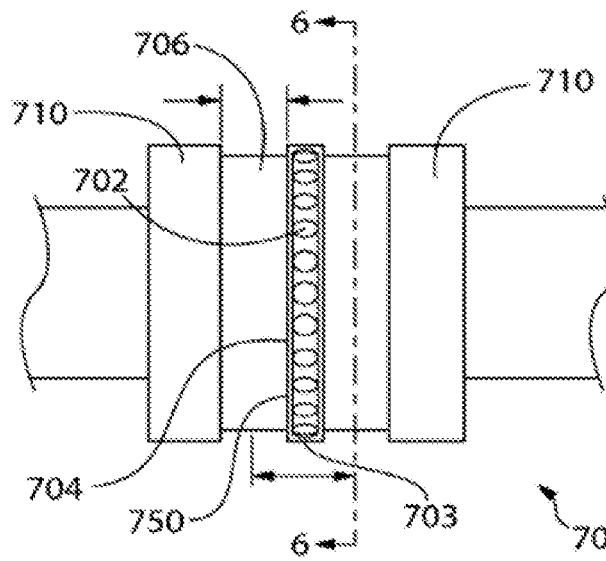
FIG. 7A is front elevational view of a stencil of one embodiment of the present invention.
Figure 7B:
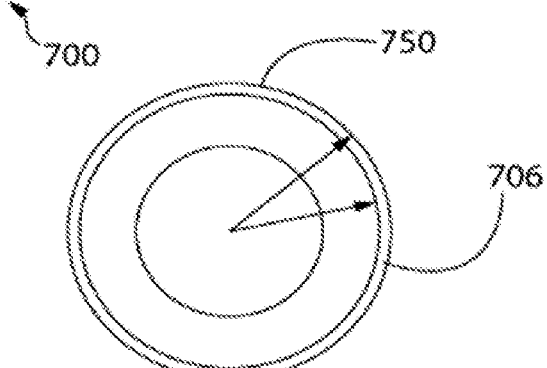
FIG. 7B is side cross sectional view of the stencil of FIG. 7 taken along line 6-6.

FIG. 7A illustrates a rotatable filling stencil 700. Filling stencil 700 includes an outer face 710 and a plurality of filling discharge ports 702. Discharge ports 702 may be arranged in an array 703 and may further be proximate discharge channel 704. In one embodiment, filling stencil 700 includes one or more circumferential channels 706. Circumferential channels 706 may extend around the entire circumference of filling stencil 700 (as illustrated in FIG. 7B) or may extend around only a portion of filling stencil 700. In a preferred embodiment, circumferential channels are sized and dimensioned to permit a filling-topped biscuit to pass filling stencil 700 such that filling stencil 700 is useful for depositing an additional filling on the biscuit without disrupting a previously deposited filling on the biscuit. In one embodiment, circumferential channels 706 have a width that is greater than the width of discharge channel 404. In one embodiment, the width of discharge channel 404 is approximately the same as the width of discharge port 302 (e.g., the diameter of a round discharge port). In one embodiment, filling stencils may include a stabilizing wall on either side of a cream deposit. In one embodiment, the stabilizing wall may be of a width of approximately 1/16 inches. In one embodiment, the circumferential channels 706 have a width of at least 9/32 inches.

As can be seen from FIGS. 3 and 7A, the number, size and orientation of arrays 303 can be selected to match or dictate the number, size and orientation of circumferential channels 706. In embodiments where a first filling stencil includes a filling port array of a different shape or configuration, a different channel configuration may be included at a second filling stencil to achieve the same effect. For example, the channel may be axially aligned on the second filling stencil where a first filling station includes an axially aligned array. For example, in systems having a first filling stencil 300 having two linear arrays 303 of discharge ports 302, a second in-line filling stencil 700 may be configured to include two circumferential channels 706.

Figure 8:
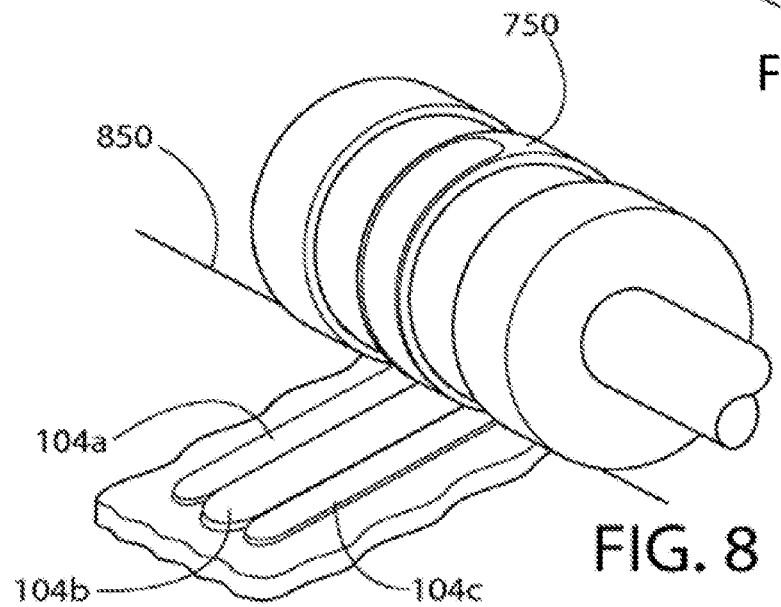
FIG. 8 is perspective view of a stencil of one embodiment of the present invention.

In one embodiment, array 703 of filling stencil 700 is interposed between circumferential channels 706. In one embodiment, filling stencil 700 includes a rib 750. Rib 750 may be configured to extend outwardly from filling stencil 700 to an outermost point on stencil 700 that is substantially in line with outer face 710. Rib 750 may be continuous or discontinuous on the circumference of filling stencil 700. During operation, filling discharged from filling discharge ports 702 may be deposited onto a biscuit that has already received filling discharged from discharge ports 302, for example. Rib 750 may be configured to allow the discharge of filling to a location on biscuit 102 between other filling deposits. For example, filling deposited through discharge ports 702 may be deposited in filling segment 104b between filling segments 104a and 104c. In one embodiment, illustrated in FIG. 8, filling segment 104b may be deposited adjacent to filling segments 104a and 104c. In one embodiment, filling segment 104b is deposited without overlapping filling segments 104a and 104c but still contacting substantially all of one side of filling segment 104a and 104c. A cutting element such as cutting wire 850 may facilitate the separation of filling segments from a filling stencil. In one embodiment, the viscosity of filling from filling stencil 700 immediately upon deposit onto biscuit 102 is lower than the viscosity of filling deposited from filling stencil 300 and those filling segments 104a and 104c may be effective barriers to prevent filling segment 104b from migrating on biscuit 102 until the filling solidifies.

Figure 9:
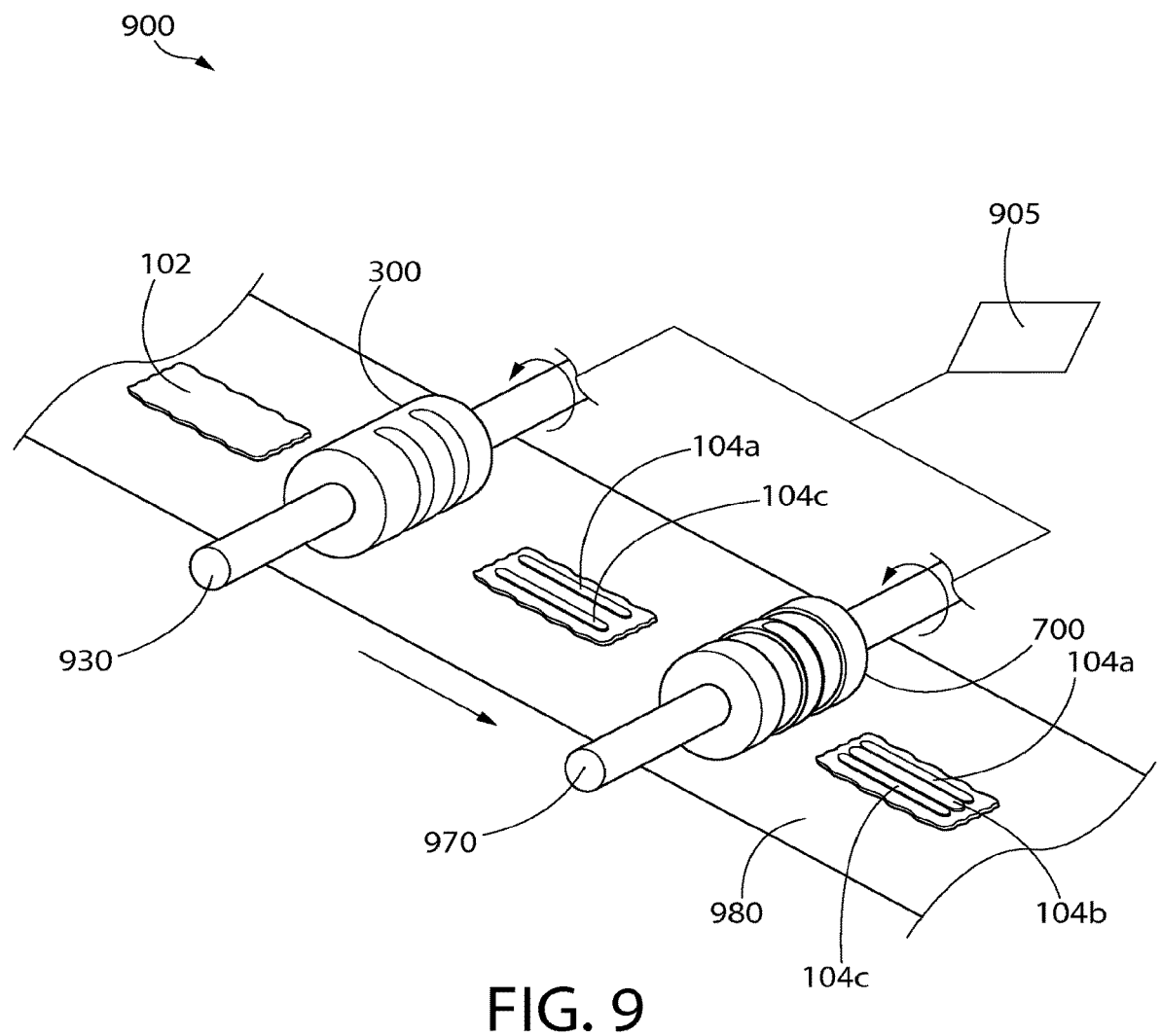
FIG. 9 illustrates a perspective view of a system of one embodiment of the present invention.

FIG. 9 illustrates one embodiment of a system 900 of the present invention. First filling station 930 includes rotating filling stencil 300 and rotating filling stencil 700. Rotating filling stencil 300 may include two rows of filling discharge ports 302 disposed on the circumference of rotating filling stencil 300. In one embodiment, discharge ports 302 are substantially round discharge ports. A first filling associated with rotating filling stencil 300 is pumped from a holding or creamer pot to a tubular shaft through filling stencil 300. As the filling flows through filling station 300, filler is discharged at an angle of from about 45 degrees to about 120 degrees where a cut-off wire is located and cuts off the filler as the filling is deposited onto the biscuit. The topped biscuit is then conveyed to second filling station 970. A second holding or creamer pot may be used to supply a second filler to the second filling station 970.

In one embodiment, second filling station 970 includes a second rotating stencil 700 having a at least one additional row of filling discharge ports 702 which are disposed on the circumference of second rotating stencil 700. The third row of filling discharge ports 702 may include an array of substantially elongated discharge ports. Filling discharge ports 702 may be configured and oriented to discharge filling from a rib located approximately in the center of filling stencil 970, the rib being bounded by two channels oriented and configured to permit the conveyance of the topped biscuit past second filling station 970 without disturbing the previously deposited filling. In one embodiment, each substantially elongated discharge port is an oval-shaped discharge port that has a major axis that is oriented transverse to the circumference of the second rotating filling stencil 700. The oval-shaped discharge ports may further be evenly spaced apart in the third row and the array of substantially oval-shaped discharge ports 702 is disposed on only one hemisphere of the second rotating stencil. In the embodiment of FIG. 9, only two fillings are applied. In other embodiments, more than two fillings are applied and in some embodiments, but more than two in-line filling stencils. In other embodiments, the order of first filling station 930 and second filling station 970 are reversed. Once the filling has been applied, the topped biscuit is then conveyed to a station where the top biscuit is applied and a pressure shoe applies pressure to the finished sandwiched product. In one embodiment, the application of pressure ensures that the finished product adheres together before it is conveyed to a cooling tunnel so the food product can be set.

System 900 further includes a conveyor 980 configured to pass a food item such as biscuit 102 in alignment with the first filling station 300 and second filling station 700. Controller 905 is programmed to control the pace of conveyor 980 and the speed of rotation of filling stencil 300 and filling stencil 900 to ensure that the filling discharged from the filling stencils is deposited on biscuit 102 in the desired location. In one embodiment, system 900 is operated at sandwiching rates of from about 120 to about 160 sandwiches per minute per row.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

To the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A method for the production of a food item having a filling, the method comprising:
   a) conveying a food item to a first filling station, the first filling station having a first rotating stencil with one or more arrays, wherein each array of the first rotating stencil comprises a plurality of filling discharge ports disposed on the circumference of the first rotating stencil;
   b) discharging from each array of the first rotating stencil at least one first filling segment having a shape and configuration onto the food item as the food item passes the first filling station;
   c) conveying the food item to a second filling station, the second filling station having a second rotating stencil with one or more arrays, wherein each array of the second rotating stencil comprises a plurality of filling discharge ports disposed on the circumference of the second rotating stencil; and
   d) discharging from each array of the second rotating stencil at least one further filling segment having a further shape and configuration onto the food item as the food item passes the second filling station, such that each further filling segment discharged at the second filling station does not overlap or disturb any first filling segment discharged at the first filling station.

2. The method of claim 1, wherein each further filling segment discharged at the second filling station is deposited between two first filling segments discharged at the first filling station.

3. The method of claim 1, wherein two further filling segments are deposited onto the food item after the at least one first filling segment is deposited onto the food item.

4. The method of claim 1, wherein the food item is a baked good having a rectangular configuration, the method further comprising depositing the at least one first filling segment and the at least one further filling segment longitudinally onto the baked good such that the at least one first filling segment and the at least one further filling segment are substantially parallel.

5. The method of claim 1, wherein the one or more arrays of the first rotating stencil comprise two spaced apart rows of filling discharge ports, wherein the filling discharge ports are substantially round filling discharge ports, each substantially round filling discharge port being substantially evenly spaced apart in each row and wherein each row is disposed on only one hemisphere of the first rotating stencil.

6. The method of claim 1, wherein the one or more arrays of the second rotating stencil comprises a row of substantially oval-shaped filling discharge ports, each substantially oval-shaped filling discharge port having a major axis that is oriented transverse to the circumference of the second rotating stencil, the oval-shaped filling discharge ports being evenly spaced apart in the row and wherein the row of substantially oval-shaped discharge ports is disposed on only one hemisphere of the second rotating stencil.

7. The method of claim 6, wherein the second rotating stencil further comprises a rib disposed between the two channels, the additional row of filling discharge ports being disposed on the rib.

8. The method of claim 1, wherein the second rotating stencil further comprises one or more circumferential channels circumferentially disposed on an outer surface of the second rotating stencil, the method further comprising: aligning the one or more circumferential channels with the shape and configuration of each first filling segment discharged onto the food item by each array of the first rotating stencil as the food item passes the second filling station.

9. The method of claim 1 further comprising:
rotating the first rotating stencil in coordination with the second rotating stencil such that the at least one first filling segment and the at least one further filling segment are deposited onto the food item in a substantially uniform volume and in a substantially parallel configuration.

10. A method for the production of a food item having a filling, the method comprising:
a) conveying a food item to a first filling station, the first filling station having a first rotating stencil with one or more arrays, wherein each array of the first rotating stencil comprises a first plurality of filling discharge ports disposed on the circumference of the first rotating stencil;
b) discharging filling from each array of the first rotating stencil to form at least one first filling segment having a shape and configuration, through the first plurality of filling discharge ports, onto the food item as the food item passes the first filling station;
c) conveying the food item to a second filling station, the second filling station having a second rotating stencil with one or more arrays, wherein each array of the second rotating stencil comprises a second plurality of filling discharge ports disposed on the circumference of the second rotating stencil; and wherein the second rotating stencil further comprises one or more circumferential channels circumferentially disposes on an outer surface of the second rotating stencil; and
d) discharging filling from each array of the second rotating stencil to form at least one additional filling segment having a further shape and configuration, through the second plurality of filling discharge ports, onto the food item as the food item passes the first filling station by aligning the one or more circumferential channels with the shape and configuration of each first filling segment discharged onto the food item by each array of the first rotating stencil such that the at least one additional filling segment is disposed on the food item adjacent to the at least one first filling segment and the at least one additional filling segment discharged at the second filling station does not overlap or disturb any first filling segment discharged at the first filling station.

11. The method of claim 10, wherein at least one of the one or more arrays of the first rotating stencil is configured in one of a row, a circle, an ellipse, a square, a rectangle, and an irregular pattern.

12. The method of claim 10, wherein the at least one first filling segment comprises two filling segments and wherein the at least one additional filling segment is interposed between the two filling segments.

13. The method of claim 10, wherein the at least one first filling segment has a first organoleptic property and the at least one additional filling segment has a second organoleptic property.

14. The method of claim 10, wherein at least one array of the first rotating stencil and the second rotating stencil further comprises a discharge channel comprising a depression in an outer face of at least one of the first rotating stencil and the second rotating stencil, the method further comprising: collecting filling in the discharge channel from at least two of the plurality of discharge ports of the at least one of the first rotating stencil and the second rotating stencil before discharging the filling onto the food item.

15. The method of claim 10, wherein the at least one first filling segment is deposited onto the food item in a first pattern and wherein the at least one additional filling segment is deposited onto the food item in a second pattern that abuts but does not overlap the first pattern.

16. The method of claim 15, wherein the first pattern comprises a first plurality of substantially parallel rows and the second pattern comprises at least one additional row that is substantially parallel to the first plurality of rows.

17. The method of claim 15, wherein the first pattern comprises an open perimetrical shape and the second pattern is disposed within the open perimetrical shape.

18. The method of claim 15, wherein the open perimetrical shape is one of a square, a circle, an ellipse and an oval having a continuous substantially uniformly deposited filling segment surrounding an open area on the food product that is substantially free of filling.

* * * * *